United States Patent [19]

Velterop

[11] Patent Number: 5,139,191

[45] Date of Patent: Aug. 18, 1992

[54] METHOD OF CONNECTING CERAMIC MATERIAL TO ANOTHER MATERIAL

[75] Inventor: Franciscus M. Velterop, Heerhugowaard, Netherlands

[73] Assignee: F. M. Velterop B.V., Heerhugowaard, Netherlands

[21] Appl. No.: 733,092

[22] Filed: Jul. 19, 1991

[30] Foreign Application Priority Data

Jul. 20, 1990 [NL] Netherlands ............... 9001662

[51] Int. Cl.$^5$ .............. B23K 31/02; B23K 35/34; B23K 35/36
[52] U.S. Cl. .......................... 228/122; 228/263.12
[58] Field of Search ............... 228/122, 263.12, 903, 228/121, 248, 263.21

[56] References Cited

U.S. PATENT DOCUMENTS

| | | | |
|---|---|---|---|
| 2,686,958 | 8/1954 | Eber et al. | 228/124 |
| 2,996,401 | 8/1961 | Welch et al. | 228/122 |
| 3,110,571 | 11/1963 | Alexander | 228/263.12 |
| 3,347,704 | 10/1967 | Meyer | 228/122 |
| 3,352,694 | 11/1967 | Reed et al. | 106/1 |

FOREIGN PATENT DOCUMENTS

| | | | |
|---|---|---|---|
| 0327049 | 8/1989 | European Pat. Off. | |
| 535660 | 10/1931 | Fed. Rep. of Germany | |
| 1289478 | 10/1969 | Fed. Rep. of Germany | |
| 60-200872 | 10/1985 | Japan | 228/122 |
| 1-268772 | 10/1989 | Japan | 228/248 |
| 906022 | 9/1962 | United Kingdom | |

OTHER PUBLICATIONS

"Bonding to Porous Ceramic Surfaces", E. H. Bogardus et al., *IBM Technical Disclosure Bulletin,* vol. 23, No 7B, Dec. 1980, p. 3391.

"Glazing High-Alumina Ceramics for Electrovacuum Applications", K. Balik, *TESLA Electronics,* vol. 8, No. 2, Jun. 1975, pp. 56–59.

"World Patent Index Latest", *Derwent Publications Ltd.,* London, GB and SU-A-471, 344, L. G. Markaryan, Sep. 25, 1975.

*Primary Examiner*—Kurt Rowan
*Assistant Examiner*—Jeffrey T. Knapp
*Attorney, Agent, or Firm*—D. Peter Hochberg; Mark Kusner; Louis J. Weisz

[57] ABSTRACT

The present invention relates to a method of connecting a ceramic material to another material. According to the present method as ceramic material porous material is used that prior to making a connection it is gradually compacted from the contact surface with the greatest density at the contact surface, wherein on the contact surface of the porous material a mixture of titanium hydride ($TiH_2$) and quartz flour ($SiO_2$) is applied. Then the so treated porous ceramic material is heated to 1200°–1800° C. during 1–40 hours. Finally the so compacted porous ceramic material in a manner known per se is connected to the other material. Preferably the treated porous ceramic material is heated to 1300°–1500° C. during 10–20 hours. Advantageously the weight proportion of $TiH_2$ and $SiO_2$ in the mixture is 95:5 to 5:95 and preferably 35:65 to 65:35.

12 Claims, 1 Drawing Sheet

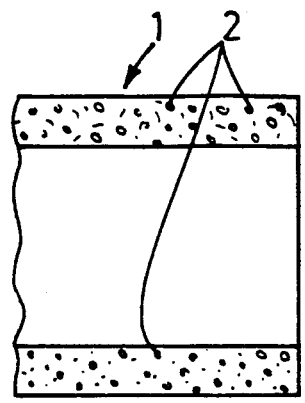 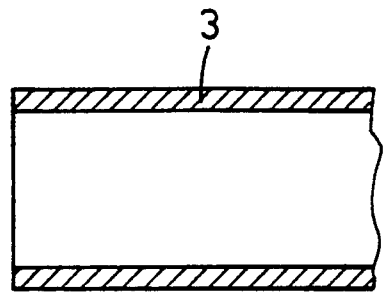
fig.1
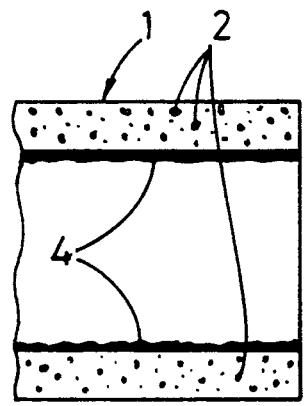 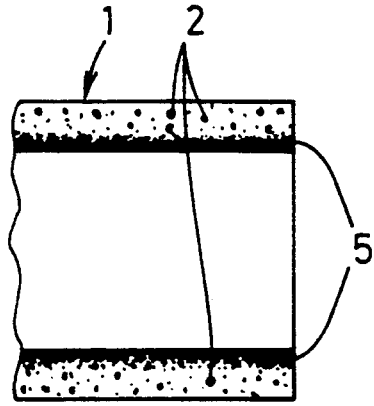
fig.2  fig.3
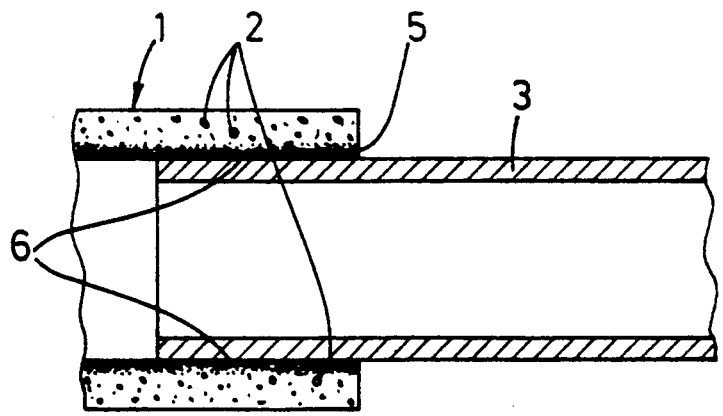
fig.4

METHOD OF CONNECTING CERAMIC MATERIAL TO ANOTHER MATERIAL

The present invention relates to a method of connecting ceramic material to another material.

Such methods of connecting ceramic material to metals in particular are already known. By adjusting the thermal expansion coefficient of the connecting material to the components to ceramic and metal a connection can be realized with a certain strength and thermal stability.

As examples may be mentioned dense $Al_2O_3$ that firstly has been provided with a metal layer of Mo-Mn. Hereby good bonding is obtained to the $A_2O_3$. Subsequently, the so metallised layer is nickel plated so as to obtain good ductility besides good bonding.

The other material, usually metal, to which the $Al_2O_3$ is connected, is nickel plated so as to obtain good bonding and ductility.

The so nickel plated parts are soldered together under vacuum with a suitable soldering material. The type of soldering material used is dependent of the envisaged use.

An alternative is the so-called active soldering. It is known that the soldering material in general in molten state does not wet the ceramic. In order that the ceramic is wettable titanium is added whereafter the ceramic without metallising can be soldered to for example metal. This technique is called active soldering. As soldering material usually a mixture of Ag/Cu 78/22% with a melting point of 780° C. is used.

When instead of dense $Al_2O_3$ porous $Al_2O_3$ is taken as ceramic material and this is directly soldered to for example stainless steel problems appear at the connection where the soldering material is penetrated into the porous ceramic.

Because of the intrinsic bad mechanical strength of the porous ceramic and the great stresses existing on the separation line (interface) of penetrated soldering material and the porous ceramic no reliable connection can be obtained, since by the difference in the thermal expansion coefficient the porous ceramic appears to break every time precisely on the separation line of the penetrated soldering material and the porous ceramic.

The invention proposes a method wherein a reliable connection can be obtained between a porous ceramic material and another material for example stainless steel having a much higher thermal expansion coefficient.

Hereto the present invention is characterized in that as ceramic material porous material is used that prior to making a connection it is gradually compacted from the contact surface with the greatest density at the contact surface, wherein on the contact surface of the porous material a mixture of titanium hydride ($TiH_2$) and quartz flour ($SiO_2$) is applied, whereafter the so treated porous ceramic material is heated to 1200°-1800° C. during 1-40 hours, whereafter the so heated porous ceramic material in a manner known per se is connected to the other material.

Surprisingly, it has appeared that by compacting the contact surface of the porous ceramic material using a mixture of titanium hydride and quartz flour by heating it has been appeared possible in this manner to obtain a very reliable connection between porous ceramic and other materials like stainless steel, which connection for a considerable time remains intact despite varying high temperature loadings.

Hereby the present invention opens the possibility of using porous materials in many fields like filters that can be connected in a gas-tight manner to stainless steel housings for separation processes at high temperature on an industrial scale.

Furthermore, the compacted porous ceramic materials of the invention may be used in fuel cells wherein the compacted porous ceramic plates must be sealed at the sides.

Another example of use of the compacted ceramic porous materials of the invention is in catalytic reactors wherein for example the pores of the material are provided with a catalyst.

It is noted that as porous ceramic material in general $Al_2O_3$ is used but $Zr_2O_3$ or SiC can also be used as porous ceramic material.

The other material to which the compacted ceramic porous material is connected is in general stainless steel but one can also use successfully other metals for example copper and aluminium or a special alloy like Vacon ® or compacted $Al_2O_3$ or another material.

The role of the mixture of titanium hydride and $SiO_2$ in compacting the porous ceramic material presumably is as follows.

During heating presumably the following reaction takes place between titanium hydride and $SiO_2$:

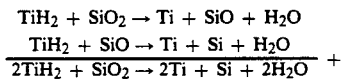

The herein formed metallic titanium acts as wetting agent.

The formed SiO and elementary Si react with the present $Al_2O_3$ whereby the melting point of the formed composition is decreased. There where the SiO and Si come in contact with the aluminium oxide the ceramic material flows and is compacted consequently. The presence of metallic components appears to improve flowing resulting in an improved compacting process.

Hereby a gradually compacted ceramic material is produced because by the progress of the reaction front decrease of the concentration of the reacting components occurs.

In accordance with the present invention a particularly good connection appears to be obtained when the porous ceramic material treated with titanium hydride and quartz flour is heated to 1300°-1500° C. during 10-20 hours.

It is noted that heating the ceramic material to the required temperature can be obtained by heating the material in a furnace. The material can also be brought to the required temperature by an acetylene burner.

The weight proportion of $TiH_2$ and $SiO_2$ in the mixture applied to the contact surface of the porous ceramic material in general is 95:5 to 5:95 and generally 35:65 to 65:35.

Adding to the mixture of $TiH_2$ and $SiO_2$ suitable metals, which are constituents of the soldering material, improves connecting the materials in that besides a better compacting also a better bonding with the soldering material is obtained.

A suitable soldering material for example is Au-Cu-Ni alloy in case the ceramic material is to be connected to stainless steel but Ag-Cu also can be used.

Preferably a binding agent is added to the mixture of titanium hydride and quartz flour. This binding agent should be used in such a quantity so that the dry mixture of titanium hydride and quartz flour gets the consistency of a paste. Such a paste can be applied to the contact surface of the porous ceramic material with a brush, spatula or otherwise so that this paste remains on the surface.

As binding agent usually water is used but other substances may also be used like for example glue or other usual binding agents under the reserve that they disappear without remainder or burn during heating.

In practice, the gradually compacted porous ceramic material often is connected to stainless steel for example in case of filters that after being connected to a stainless steel housing in a gas-tight manner are particularly suitable for separation processes at high temperature on an industrial scale.

The invention will be further explained by the drawing representing a preferred embodiment of the invention.

FIG. 1 shows a non-compacted porous ceramic tube and a stainless steel tube to which the ceramic material is connected.

FIG. 2 shows a porous non-compacted ceramic tube of which the contact surface is provided with an aqueous paste of $TiH_2$, $SiO_2$ and Au-Cu-Ni as soldering material.

FIG. 3 shows the ceramic tube compacted at the contact surface.

FIG. 4 shows the ceramic tube and the stainless steel tube connected together.

In FIG. 1 a tube 1 made from porous ceramic material is shown in which the pores 2 are visible. The ceramic material is made from $Al_2O_3$. Instead of $Al_2O_3$ one can also take $Zr_2O_3$ or SiC.

The material to which the ceramic material is connected is a stainless steel tube 3. Instead of stainless steel one can also take other metals like for example copper or aluminium or a special alloy but also for example dense $Al_2O_3$.

In FIG. 2 the reference 4 designates the layer of $TiH_2$, $SiO_2$ and Au-Cu-Ni applied in the form of a paste as soldering material. This layer is applied in the form of an aqueous paste by a brush or spatula.

In FIG. 3 the compacted layer 5 is shown, which layer has been obtained by heating the treated ceramic material of FIG. 2. The gradual compacting from the contact surface into the porous ceramic is clearly visible whereby the stress of the connection is distributed over the compacted portion of the porous ceramic material.

In FIG. 4 the connection 6 between the compacted porous ceramic tube 2 and the stainless tube 3 is clearly visible. The connection between the compacted porous ceramic tube and the stainless tube also can take place indirectly by an intermediate ring of for example dense $Al_2O_3$.

When using a soldering material in connecting both tubes no penetration of soldering material in the pores takes place and the stress is distributed over the gradually compacted upper layer over some tenths of millimeters. Since the compacted material is much stronger than the porous material the new bonding layer can support the stresses due to temperature changes without problems during a long time. Of particular advantage is the fact that the new bonding layer contains titanium that also serves as wetting agent in soldering.

It will be clear that the present invention is not limited to the embodiment shown in the drawing. So for example the compacted layer of the porous ceramic material may be at the outer side of the tube and in such case the connection of the compacted ceramic material and the stainless steel takes place at the inner side of the steel tube. The tubes may also be connected together in abutting relationship. Furthermore it will be clear that instead of tubes plates can also be used.

I claim:

1. A process for connecting a porous ceramic first material to a second material characterized in that the surface of the first material is densified by being treated through the application thereto of a mixture of titanium hydride ($TiH_2$) and quartz flour ($SiO_2$) and then heated to from about 1200° to 1800° C. for from about 1 to 40 hours thereby increasing the density of the surface area and the area adjacent thereto, the greatest increase occurring at said surface, and thereafter connecting said first and second materials.

2. Method of claim 1, characterized in that the treated porous ceramic material is heated to 1300°-1500° C. for 10-20 hours.

3. Method of claim 1, characterized in that the weight proportion of $TiH_2$ and $SiO_2$ in the mixture is 95:5 to 5:95.

4. Method of claim 1, characterized in that the weight proportion $TiH_2$ and $SiO_2$ is 35:65 to 65:35.

5. Method of claims 2, characterized in that to the mixture of $TiH_2$ and $SiO_2$ a suitable soldering material is added.

6. Method of claim 1, characterized in that as soldering material Au-Cu-Ni alloy is used.

7. Method of claim 1, characterized in that as soldering material Ag-Cu alloy is used.

8. Method of claim 1, characterized in that to the mixture of titanium hydride and quartz flour, optionally including a soldering material, a binding agent is added.

9. Method of claim 1, characterized in that as binding agent water is used.

10. Method of claim 1, characterized in that the second material to which the densified ceramic material is connected, is stainless steel.

11. Method of claim 8 in which said mixture also contains a soldering material.

12. A process for connecting a porous ceramic first material to a second material characterized in that the surface of the first material is densified by being treated through the application thereto of a mixture of titanium hydride ($TiH_2$) and quartz flour ($SiO_2$) and then heated to from about 1200° to 1800° C. from about 1 to 40 hours, thereby increasing the density of the surface area and the area adjacent thereto, the greatest increase occurring at said surface, and thereafter connecting said first and second materials, said process being further characterized in that the weight portion of $TiH_2$ and $SiO_2$ is 35-65 to 65-35.

* * * * *